United States Patent [19]

Miyake et al.

[11] Patent Number: 4,907,247
[45] Date of Patent: Mar. 6, 1990

[54] SATELLITE DELAY SIMULATION SYSTEM

[75] Inventors: Toshiaki Miyake; Mikio Ujiie, both of Tokyo, Japan

[73] Assignee: NEC Corporation, Japan

[21] Appl. No.: 314,100

[22] Filed: Feb. 22, 1989

[30] Foreign Application Priority Data

Feb. 23, 1988 [JP] Japan .................................. 63-40431

[51] Int. Cl.$^4$ ............................................. H04B 17/02
[52] U.S. Cl. ....................................... 375/10; 375/118; 455/12; 455/67
[58] Field of Search .......................... 371/1, 20.1, 20.2; 364/459; 379/1, 22; 455/12, 13, 67; 375/3.1, 10, 106, 118; 370/13, 104, 108

[56] References Cited

U.S. PATENT DOCUMENTS 4,115,661 9/1978 Schmidt ............................. 370/104
4,456,988 6/1984 Nakagome et al. .................... 455/12

Primary Examiner—Benedict V. Safourek
Attorney, Agent, or Firm—Ostrolenk, Faber, Gerb & Soffen

[57] ABSTRACT

Equipment for testing a digital satellite communication system in which multiple digital satellite communication terminals are interconnectable over multiple channels. The equipment includes a single satellite delay simulator intervening between transmit communication terminals and receive communication terminals. The delay simulator is implemented by a satellite delay circuit accommodating multiple channels, and clock matching circuits each being connected to the output or the input of the delay circuit, whereby the communication terminals are individually connectable to the delay circuit via the clock matching circuits. With this configuration, the equipment tests the system by applying a satellite delay simulation to all of the communication terminals, which are operating on independent clocks, at the same time and by using a single satellite delay simulator.

5 Claims, 5 Drawing Sheets

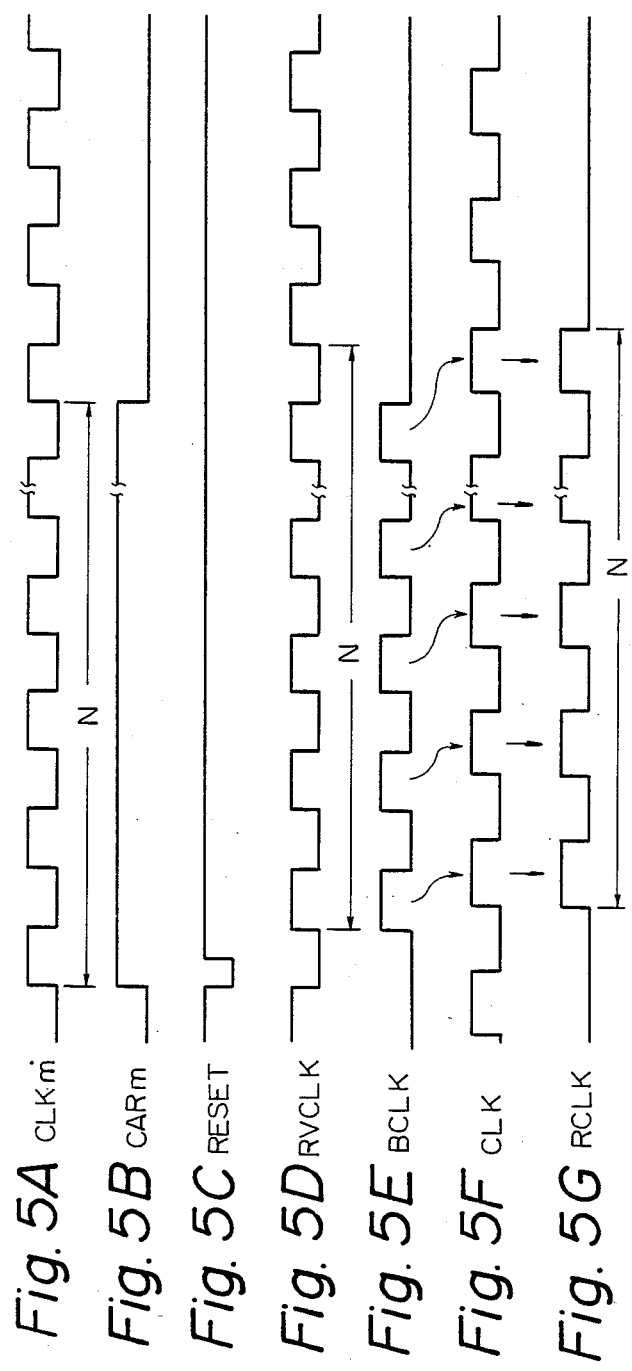

SATELLITE DELAY SIMULATION SYSTEM

BACKGROUND OF THE INVENTION

The present invention relates to an apparatus for testing a digital satellite communication system in which digital satellite communication units or terminals are interconnected by multiple channels and, more particularly, to a system testing apparatus which, by using a single satellite delay simulator, applies a delay to all of the communication terminals that are operated on independent clocks. Further, the present invention is concerned with an improved satellite delay simulator.

Two different approaches are available for testing a digital satellite communication system having a plurality of digital satellite communication terminals which are interconnected by multiple channels. One of them is to allocate a single satellite delay simulator to each of the channels of the communication system. Although this kind of scheme is successful in testing the system without effecting the independence of the individual clocks on which the communication units are operated, the number of delay simulators has to be increased with the number of channels resulting in the overall size and cost of the testing equipment being increased. The other approach known in the art is such that all the channels share a single satellite delay simulator. This is advantageous over the one-to-one allocation scheme in that it cuts down the cost and size of the testing equipment. However, the single delay simulator scheme has a drawback that the clocks each being assigned to a particular communication terminal have to be synchronized to the clock of the single delay simulator without exception and, hence, the testing conditions are different from the actual conditions in which the system is operated.

SUMMARY OF THE INVENTION

It is therefore an object of the present invention to provide a satellite delay simulator capable of testing a digital satellite communication system alone by applying a satellite delay to all of a plurality of digital satellite communication terminals, which are operated on independent clocks, at the same time.

It is another object of the present invention to provide a generally improved satellite delay simulator for a digital satellite communication system.

A satellite delay simulator for testing a digital satellite communication system in which digital satellite communication terminals are interconnectable over multiple channels of the present invention comprises a satellite delay circuit having a plurality of channels, first clock matching circuits provided between the communication terminals on a transmit side and the delay circuit for converting a time sequence formated by a clock particular to any of the communication terminals into a time sequence by using a clock particular to the delay circuit, and second clock matching circuits provided between the delay circuit and the communications terminals on a receive side for reconverting the time sequence associated with the clock of the delay circuit into the time sequence formated by the clock of the communication terminal.

BRIEF DESCRIPTION OF THE DRAWINGS

The above and other objects, features and advantages of the present invention will become more apparent from the following description taken with the accompanying drawings in which:

FIGS. 5A to 5G are timing charts representative of FIFO (First-in First-Out) read and write clocks on a forward route of the clock matching circuits shown in FIG. 4.

DESCRIPTION OF THE PREFERRED EMBODIMENT

To better understand the present invention, a brief reference will be made to two different types of prior art testing equipment applicable to a digital satellite communication system.

Figure 1:
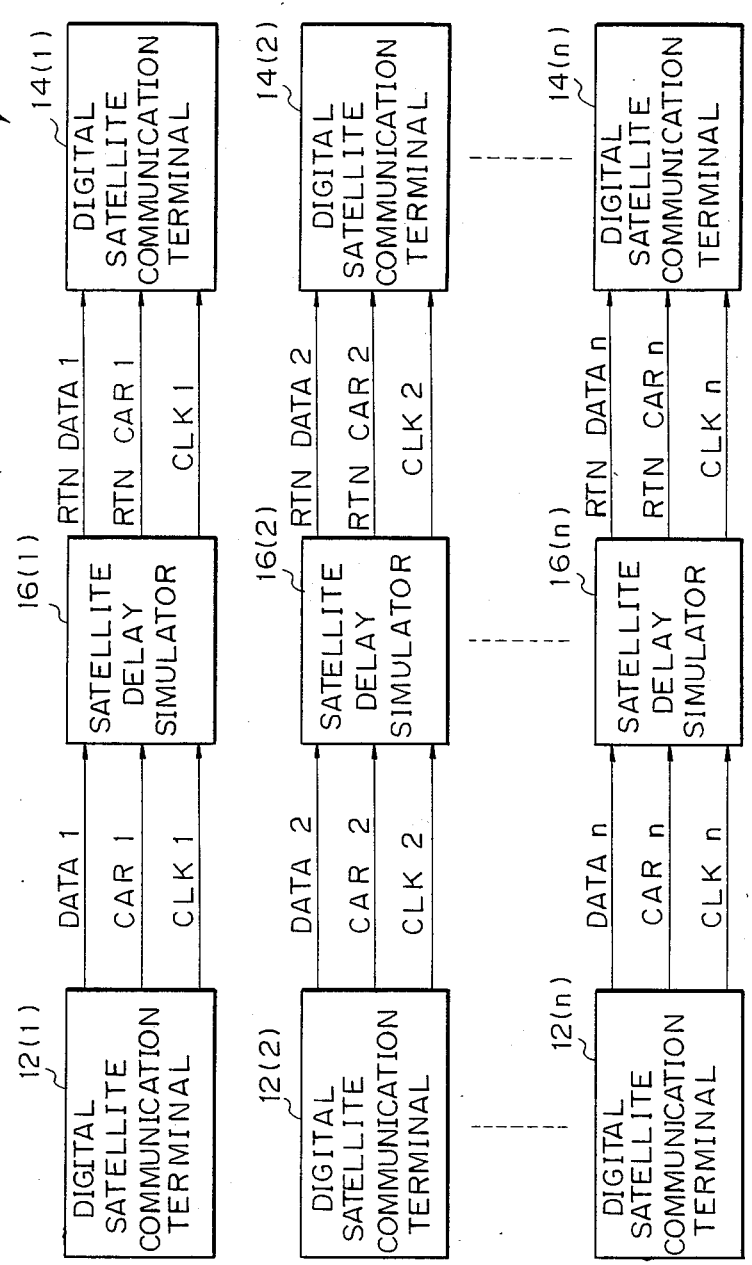
FIG. 1 is a schematic block diagram showing prior art testing equipment of the type allocating one satellite delay simulator to each channel.
Figure 2:
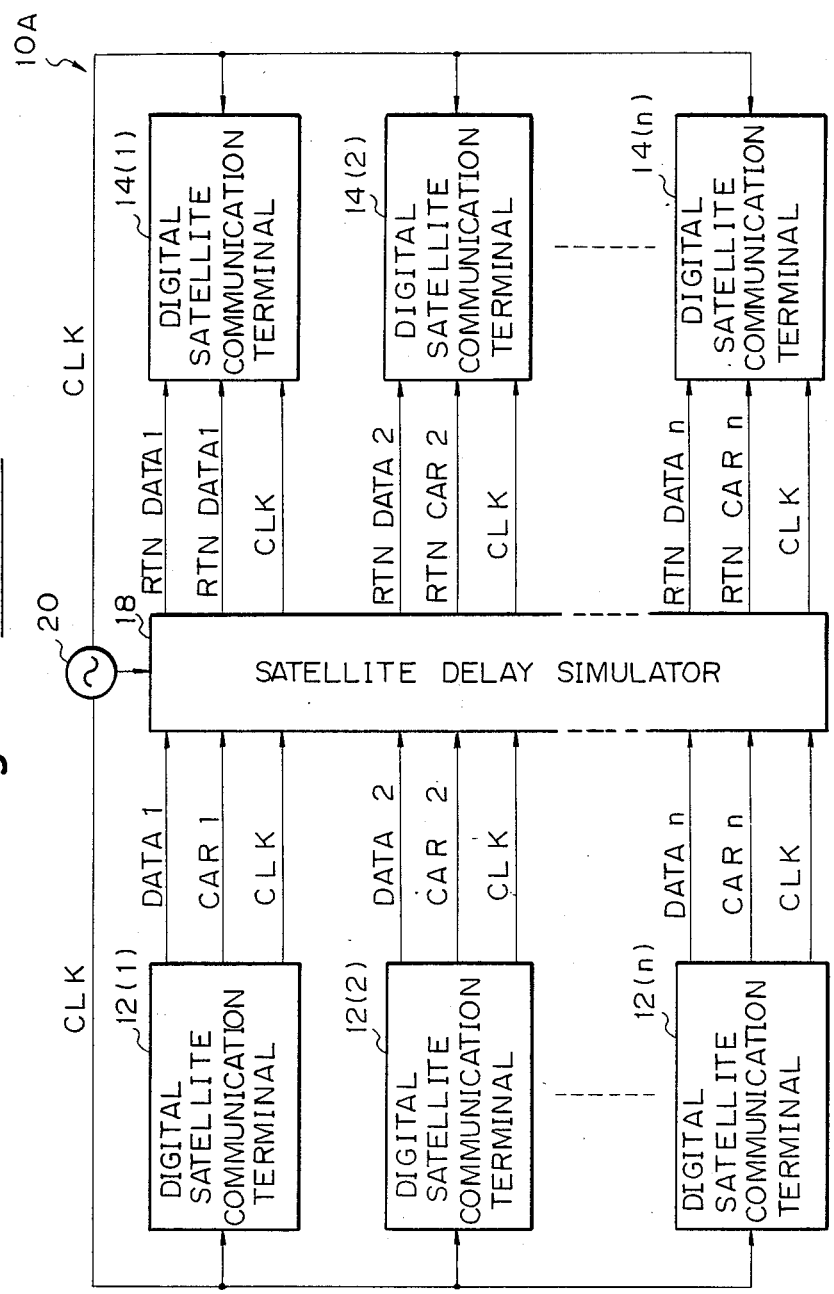
FIG. 2 is a view similar to FIG. 1, showing another prior art testing equipment which assigns a single satellite delay simulator to all channels.

Referring to FIG. 1, one of the prior art testing equipment is shown as being incorporated in a digital satellite communication system 10 which has digital satellite communication terminals 12(1) to 12(n) and 14(1) to 14(n) connectable to each other over n channels, where n is a natural number. The terminals 12(1) to 12(n) are transmit terminals and the terminals 14(1) to 14(n) are receive terminals. The testing equipment has n satellite delay simulators 16(1) to 16(n) each being assigned to a respective one of the channels, i.e., paired communication terminals 12(1) and 14(1), 12(2) and 14(2), ..., 12(n) and 12(n). FIG. 2 shows a digital satellite communication system 10A implemented by another prior art testing equipment. In FIG. 2, a single satellite delay simulator 18 is shared by all of the communication terminals 12(1) to 12(n) and 14(1) to 14(n). In FIGS. 1 and 2, transmit data are labeled DATA1 to DATAn, delayed return data are labeled RTN DATA1 to RTN DATAn, communication control signals are labeled CAR1 to CARn, delayed return communication control signals are labeled RTN CAR1 to RTN CARn, and clocks are labeled CLK and CLK1 to CLKn. While the equipment shown in FIG. 1 does not effect the independence of the individual clocks of the communication units 12(1) to 12(n) and 14(1) to 14(n), it has a drawback that a great number of satellite delay simulators are needed. The equipment of FIG. 2 needs only a single satellite delay simulator, but it has to synchronize the clocks of all of the communication units 12(1) to 12(n) and 14(1) to 14(n) to a clock particular to the delay simulator 18. Although the synchronization is achievable with a clock generator 20 as shown in FIG. 2, a problem with the single delay simulator scheme is that the testing conditions are different from the actual conditions of use of the communication system 10A.

The present invention proposes a new and useful implementation for testing a digital satellite communication system in which a digital satellite communication terminal on the earth is connectable to another such terminal on the ground by satellite delay. Specifically, in the event of testing this kind of communication system by using a satellite delay simulator which introduces a simulated delay involved in the propagation of an electromagnetic wave from the earth to a satellite transponder and then from the transponder to the earth without using the transponder, the present invention contemplates to provide the delay by using clocks particular to the communication terminals which are different from a clock of the delay simulator. To provide such a delay, transmit data and a communication control signal arranged in a time sequence by a clock of a communication terminal are once rearranged in a time sequence by a clock of the delay circuit to be delayed thereby, then the delayed data and control signal are restored to the original time sequence associated the clock of the communication terminal, and then the resulting data and control signal are transmitted. The two times of conversion of time sequence are implemented by means having exactly the same construction.

Figure 3:
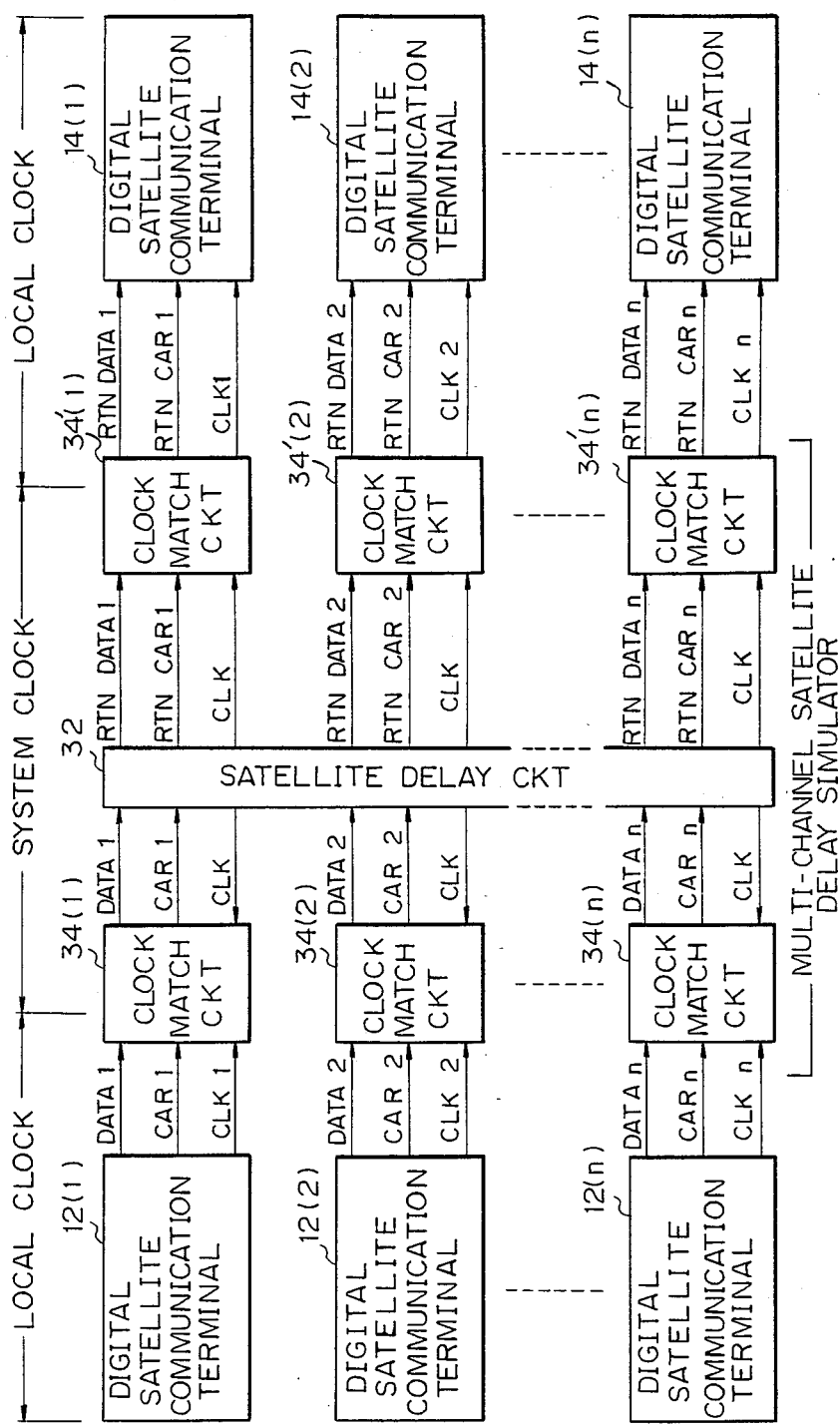
FIG. 3 is a block diagram schematically showing testing equipment which is implemented by a satellite delay simulator embodying the present invention.

Referring to FIG. 3, there is shown a digital satellite communication system 30 including testing equipment which is implemented by a satellite delay simulator embodying the present invention. In the figure, the same or similar structural elements and data, signals and clocks as those shown in FIG. 2 are designated by like reference numerals and characters. As shown, the testing equipment is made up of a single multi-channel satellite delay circuit 32 and clock matching circuits two of which are assigned to each digital satellite communication channel, i.e., interconnectable communication terminals 12(1) and 14(1), 12(2) and 14(2), ..., 12(n) and 14(n). Specifically, n clock matching circuits 34(1) to 34(n) are provided between the delay circuit 32 and the communication terminals 12(1) to 12(n), and n clock matching circuits 34'(1) to 34'(n) are provided between the delay circuit 32 and the communication terminals 14(1) to 14(n). In the illustrative embodiment, the satellite delay simulator is constituted by the delay circuit 32 and clock matching circuits 34(1) to 34(n) and 34'(1) to 34'(n). The delay simulator is capable of handling up to n channels of transmit data alone and without effecting the local clocks assigned to the communication terminals 12(1) to 12(n) and the local clocks assigned to the communication terminal 14(1) to 14(n), by synchronizing transmit data DATA1 to DATAn and RTN DATA1 to RTN DATAn to the clock (system clock) particular to the delay circuit 32.

Figure 4:
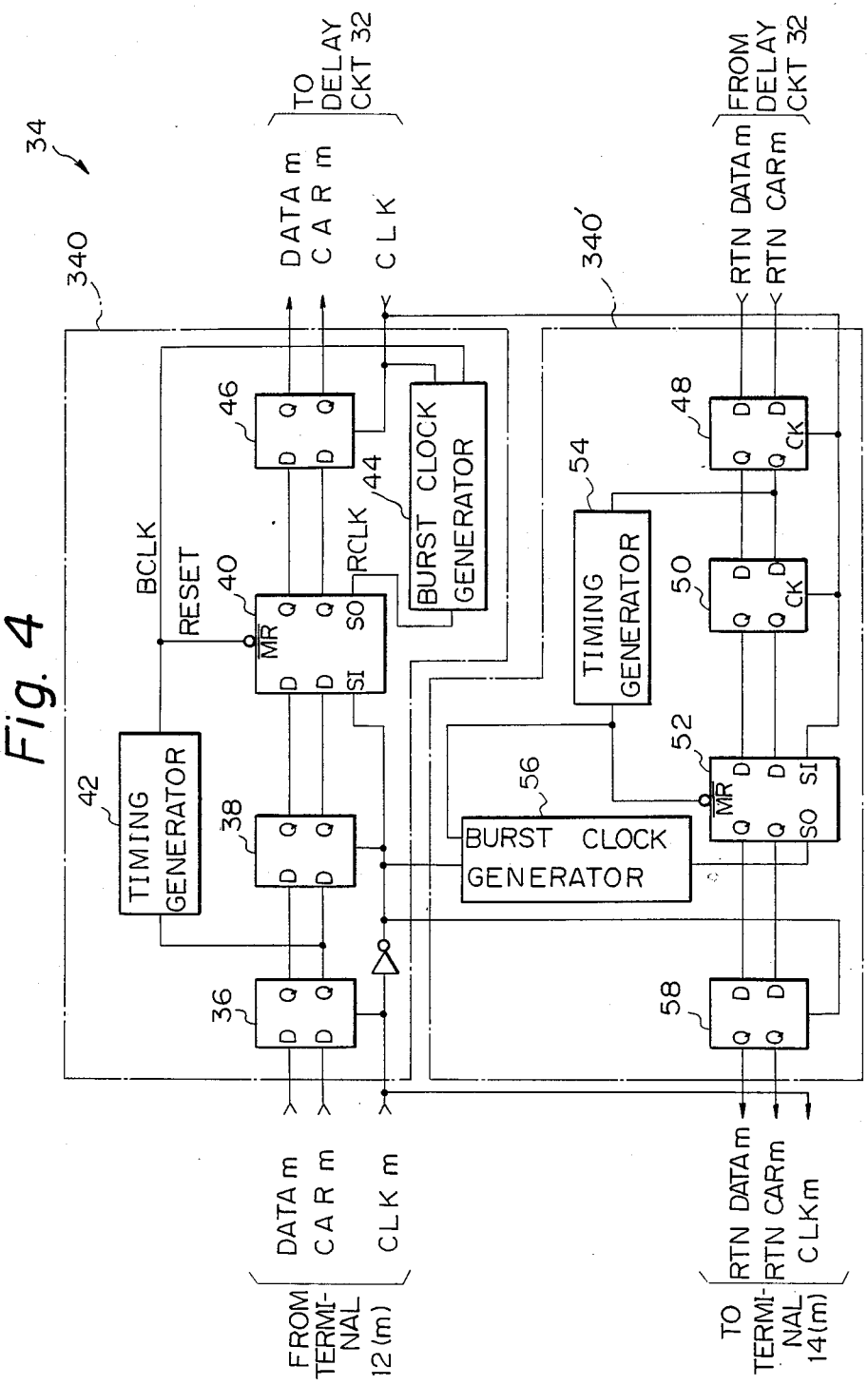
FIG. 4 is a schematic block diagram showing a specific construction of clock matching circuits which are included in the equipment of FIG. 3 and assigned to the same channel.

FIG. 4 shows a specific construction of two of the clock matching circuits 34 which are provided on the same channel. As shown, a first clock matching circuit 340 is disposed on a transmit route extending from any of the transmit terminals 12(1) to 12(n) to the satellite delay circuit 32, while a second clock matching circuit 340' is disposed on a transmit channel extending from the satellite delay circuit 32 to one of the receive terminals 14(1) to 14(n) which is associated with the transmit terminal. The clock matching circuit 340 converts a time sequence derived from the local clock of the transmit terminal 12 into a time sequence which is based on the system clock of the delay circuit. On the other hand, the clock matching circuit 340' converts, or restores, the time sequence outputted by the circuit 340 into the original time sequence derived from the local clock. The clock matching circuit 340 comprises input latches 36 and 38 arranged in two consecutive steps, a FIFO memory 40, a timing generator 42, a burst clock generator 44, and an output latch 46. Likewise, the clock matching circuit 340' comprises input latches 48 and 50, a FIFO memory 52, a timing generator 54, a burst clock generator 56, and an output latch 58.

In FIG. 3, transmit data DATAm from the m-th communication terminal 12(m), for example, is retimed by the input latches 36 and 38 of the first clock matching circuit 340 by using a transmit clock CLKm (FIG. 5A) particular to the communication terminal 12(m). The retimed data is written in the FIFO memory 40 in synchronism with a clock RVCLK which is produced by inverting the transmit clock CLKm. The timing generator 42 senses the beginning of a packet or burst on the basis of the communication control signal CARm (FIG. 5B) and delivers a reset signal RESET (FIG. 5C) to the FIFO memory 40. Another function of the timing generator 42 is to sense a clock BCLK (FIG. 5E) contained in the burst and feeds it to the burst clock generator 44. When the burst clock generator 44 receives the clock BCLK in the burst from the timing generator 42 and a reference transmit clock CLK (FIG. 5F) from the satellite delay circuit 32, it generates the same number of reference transmit clock pulses CLK as the clock pulses BCLK while delivering them to the FIFO memory 40 in the form of a read clock RCLK (FIG. 5G). Consequently, the transmit data and communication control signal read out of the memory 40 timed to the read clock RCLK are arranged in a time sequence which is based on the reference transmit clock CLK. More specifically, the data and control signal read out of the memory 40 are retimed by the output latch 44 by using the reference transmit clock CLK, then fed to the delay circuit 32 in the form of transmit data DATAm and communication control signal CARm, and then outputted by the delay circuit 32 with a predetermined time of delay.

The delayed data RTN DAAm and communication control signal RTN CARm are returned from the delay circuit 32 to the second clock matching circuit 340'. In response, the clock matching circuit 340' retransforms the data and control signal arranged by the reference transmit clock CLK into a time sequence which is associated with the transmit clock of the communication unit 14(m). More specifically, the delayed data RTN DATAm and communication control signal RTN CARm are retimed in two consecutive steps by the input latches 48 and 50 and written in the FIFO memory 52. The timing generator 54 produces a timing from the delayed communication control signal RTN CARm to feed a reset timing to the FIFO 52. Also, when the timing generator 54 senses the clock in the burst, it delivers it to the burst clock generator 56. Receiving the transmit clock CLKm of the communication terminal 12(m) as well as the clock from the timing generator 54, the burst clock generator 56 generates the same number of transmit clock pulses CLKm as the clock pulses contained in the burst while applying them to the FIFO memory 52 in the form of a read clock. As a result, the data and communication control signal read out of the memory 52 are arranged in a time sequence associated with the transmit clock of the communication terminal 12(m). That is, the data and control signal outputted by the memory 52 are retimed by the output latch 58 by using the transmit clock CLKm of the communication terminal 12(m) and then transmitted to the receive terminal 14(m) as if they were delayed by satellite delay, i.e. as a delayed signal.

In summary, in accordance with the present invention, a satellite delay simulator includes a satellite delay circuit accommodating a plurality of channels, and clock matching circuits each being connected to the input of the output of the delay circuit. Digital satellite communication terminals are therefore individually connectable to the delay circuit via the clock matching circuits. In this configuration, communication data and communication control signals can be delayed by a predetermined period of time even if the clocks of the communication terminals and the clock of the delay device are different from each other. Further, the satellite delay simulator is capable of delaying alone and at the same time a plurality of communication terminals which are operating on independent clocks.

Various modifications will become possible for those skilled in the art after receiving the teachings of the present disclosure without departing from the scope thereof.

What is claimed is:

1. A satellite delay simulator for testing a digital satellite communication system in which digital satellite communication terminals are interconnectable over multiple channels, comprising:
    satellite delay simulation means having a plurality of channels;
    first clock matching means provided between said communication terminals on a transmit side and said delay simulation means for converting a time sequence formated by a clock particular to any of said communication terminals into a time sequence by using a clock particular to said delay simulation means; and
    second clock matching means provided between said delay simulation means and said communications terminals on a receive side for reconverting the time sequence associated with the clock of said delay simulation means into the time sequence formated by the clock of said communication terminal.

2. A satellite delay simulator as claimed in claim 1, wherein said first clock matching means comprises a plurality of clock matching circuits provided between said communication terminals on the transmit side and said delay simulation means and each being assigned to a respective one of the channels.

3. A satellite delay simulator as claimed in claim 2, wherein said second clock matching means comprises a plurality of clock matching circuits provided between said delay simulation means and said communication terminals on the receive side and each being assigned to a respective one of the channels.

4. A satellite delay simulator as claimed in claim 1, wherein each of said clock matching circuits which constitute said first clock matching means comprises:
    a first input latch for retiming transmit data and a communication control signal from any of said communication terminals on the transmit side which is provided on any of the channels by a clock which is fed from said communication terminal;
    a first FIFO (First-In First-Out) memory for writing the retimed transmit data and communication control signal in response to the clock;
    a first timing generator for feeding a reset signal to said first FIFO memory upon sensing a beginning of a burst out of the communication control signal and sensing and outputting a clock contained in the burst;
    a first burst clock generator for generating, in response to the clock in the burst and the clock from said delay simulation means, the same number of clock pulses as pulses of the clock of the burst while delivering the clock pulses to said FIFO memory in the form of a read clock; and
    a first output latch for retiming the transmit data and communication control signal read out of said FIFO memory in synchronism with the clock from said delay simulation means and feeding the retimed communication data and communication control signal to said delay simulation means.

5. A satellite delay simulator as claimed in claim 4, wherein each of said second clock matching circuits which constitute said second clock matching means comprises:
    a second latch for retiming the delayed transmit data and communication control signal from said delay simulation means in response to the clock which is fed from said delay simulation means;
    a second FIFO memory for writing the retimed transmit data and communication control signal in response to the clock from said delay simulation means;
    a second timing generator for deliverig a reset signal to said second FIFO memory upon sensing a beginning of a burst out of the communication control signal and sensing and outputting a clock contained in the burst;
    a second burst clock generator for generating, in response to the clock of the burst and the clock from said communication terminal, the same number of clock pulses as pulses of the clock of the burst while delivering the clock pulses to said second FIFO memory in the form of a read clock; and
    a second output latch for retiming, in response to the clock from said communication terminal, the transmit data and communication control signal which are read out of said second FIFO memory and sending the retimed transmit data and communication control signal to one of said communication terminals on the receive side.

* * * * *